United States Patent [19]

Katada

[11] Patent Number: 6,032,022

[45] Date of Patent: Feb. 29, 2000

[54] INDIVIDUAL RADIO SELECTIVE CALLING RECEIVER

[75] Inventor: Nobuyuki Katada, Shizuoka, Japan

[73] Assignee: NEC Corporation, Tokyo, Japan

[21] Appl. No.: 08/881,592

[22] Filed: Jun. 24, 1997

[30] Foreign Application Priority Data

Jun. 25, 1996 [JP] Japan ................................. 8-164261

[51] Int. Cl.[7] ....................................................... H04Q 7/00
[52] U.S. Cl. ................... 455/31.2; 455/458; 340/825.44
[58] Field of Search ............................... 455/31.2, 31.1,
455/31.3, 418, 419, 420, 426, 458, 551,
556, 92; 379/56, 57; 340/825.44, 825.46,
825.47; 711/111, 147, 4, 161

[56] References Cited

U.S. PATENT DOCUMENTS

| | | | |
|---|---|---|---|
| 4,701,943 | 10/1987 | Davis et al. | 455/31.2 |
| 4,748,655 | 5/1988 | Thrower et al. | 455/461 |
| 4,811,376 | 3/1989 | Davis et al. | 455/31.2 |
| 4,878,051 | 10/1989 | Andros et al. | 340/825.44 |
| 4,890,315 | 12/1989 | Bendixen et al. | 455/554 |
| 5,045,850 | 9/1991 | Andros et al. | 340/825.44 |
| 5,473,667 | 12/1995 | Neustein | 455/31.2 |
| 5,546,077 | 8/1996 | Lipp et al. | 340/825.44 |
| 5,594,945 | 1/1997 | Lewis et al. | 455/38.1 |
| 5,787,355 | 7/1998 | Bannister et al. | 455/458 |

FOREIGN PATENT DOCUMENTS

| | | |
|---|---|---|
| 59-15341 | 1/1984 | Japan . |
| 64-29029 | 1/1989 | Japan . |
| 4-329035 | 11/1992 | Japan . |

*Primary Examiner*—Dwayne D. Bost
*Assistant Examiner*—Charles Craver
*Attorney, Agent, or Firm*—Young & Thompson

[57] ABSTRACT

An individual radio selective calling receiver for selectively receiving and displaying a message transmitted by radio and having an identification number assigned thereto to selectively call the receiver includes an identification number storage section, a command registering section, a radio reception section, a command detecting section, and a control section. The identification number storage section stores identification numbers including an identification number assigned to the self-receiver. The command registering section inputs and stores an identification number copy command. The radio reception section selectively receives a message to which an identification number identical to the one registered in the identification number registering section is assigned. The command detecting section monitors the message received by the radio reception section and detects the identification number copy command registered in the command registering section. When the identification number copy command is detected from the received message by the command detecting section, the control section recognizes a message portion following the command as an identification number temporarily assigned to the self-receiver, and registers the message portion in the identification number storage section.

8 Claims, 5 Drawing Sheets

INDIVIDUAL RADIO SELECTIVE CALLING RECEIVER

BACKGROUND OF THE INVENTION

1. Field of the Invention

The present invention relates to a radio selective calling receiver and, more particularly, to an individual radio selective calling receiver for selectively receiving a message transmitted by radio and having an identification number assigned thereto to be selectively called, and displaying the message.

2. Description of the Prior Art

Different identification numbers (to be referred to as ID numbers hereinafter), which are addresses used for selective calling, and corresponding telephone numbers are uniquely assigned to conventional individual radio selective calling receivers by a radio selective calling system manager. When a caller is to call a given individual radio selective calling receiver (user) to transmit a message thereto, the caller originates a call to the radio selective calling system to call at the corresponding telephone number as the destination, thus transmitting the message. The radio selective calling system adds an ID number corresponding to this telephone number to the message to generate a radio selective call signal, and transmits it as a radio signal through a radio base station. When each individual radio selective calling receiver receives the radio selective call signal and detects that an ID number identical to the stored self-ID number is contained in the received signal, the receiver recognizes that it is called, and receives and displays the succeeding message. In addition, the receiver notifies the user of the reception of the call by using a buzzer or the like.

Since the above conventional individual radio selective calling receivers respectively have different ID numbers, a calling operation must be performed a plurality of numbers of times to call the users of a plurality of individual radio selective calling receivers. In addition, even if a caller carries an individual radio selective calling receiver, since he/she cannot receive the message that he/she has transmitted, he/she cannot check whether the message has been accurately transmitted to the callees.

In order to solve this problem, as a scheme of simultaneously calling a plurality of individual radio selective calling receivers, a scheme has been proposed (Japanese Unexamined Patent Publication No. 4-329035), in which individual ID numbers are respectively assigned to a plurality of individual radio selective calling receivers held by a subscriber's family, in addition to a common telephone number, thereby allowing the users to arbitrarily select individual calling/simultaneous calling. According to this scheme, simultaneous calling is allowed only among a plurality of individual radio selective calling receivers held by the same subscriber, i.e., receivers to which the same telephone number is assigned. Furthermore, when simultaneous calling is performed, all these receivers are called, but an arbitrary combination of receivers cannot be called. This scheme cannot be applied to a radio selective calling system in which the ID numbers in selective call signals are converted in one-to-one correspondence with telephone numbers. Another simultaneous calling scheme has been proposed (Japanese Unexamined Patent Publication No. 59-15341), in which a common telephone number for simultaneous calling is assigned to a plurality of individual radio selective calling receivers, in addition to telephone numbers for individual calling. According to this scheme, however, a combination of receivers for which simultaneous calling is to be performed must be informed to the radio selective calling system manager in advance, and it is difficult to change the combination frequently. In addition, a caller must remember a common telephone number for simultaneous calling as well as an individual radio calling telephone number.

SUMMARY OF THE INVENTION

The present invention has been made in consideration of the above situation, and has as its object to provide an individual radio selective calling receiver which can store the ID numbers unique to other receivers as ID numbers temporarily assigned to the self-receiver, in addition to the ID number uniquely assigned to the self-receiver, to quickly and easily transmit the same message to an arbitrary combination of receivers and perform transmission confirmation.

In order to achieve the above object, according to the basic aspect of the present invention, there is provided an individual radio selective calling receiver for selectively receiving and displaying a message transmitted by radio and having an identification number assigned thereto to selectively call the receiver, comprising:

identification number storage means for storing a plurality of identification numbers including an identification number uniquely assigned to the self-receiver;

command registering means for user inputting and storing an identification number copy command specified in advance;

radio reception means for selectively receiving a message to which an identification number identical to the identification number registered in the identification number registering means is assigned;

command detecting means for monitoring the message received by the radio reception means and detecting the identification number copy command registered in the command registering means; and control means for, when the identification number copy command is detected from the received message by the command detecting means, recognizing a message portion following the command as an identification number temporarily assigned to the self-receiver, and registering the message portion in the identification number storage means.

In the arrangement according to the basic aspect, the control means may erase the identification number copy command registered in the command registering means when the command detecting means detects the identification number copy command from the received message.

Further, the user registering the copy command in the command registering means enables the user to control when and who can change the identification numbers stored in that user's receiver.

In addition, the receiver may further include means for erasing identification numbers registered in the identification number storage means except for the identification number assigned to the self-receiver.

According to the present invention having the above aspects, each individual radio selective calling receiver includes the identification number storage means for storing a plurality of identification numbers including a unique identification number as identification numbers (ID numbers) to be used to identify calls addressed to the self-receiver and receive messages, the command registering means for storing an identification number copy command, and the control means for, when an identification number copy command in a received message is detected, recognizing a message portion following the command as an identification number temporarily assigned to the self-receiver, and registering it in the identification number storage means. With this arrangement, a plurality of individual radio selective calling receivers can have the same identification number, and a caller can transmit the same message (simultaneous calling) to a plurality of individual radio selective calling receivers by one calling operation. In addition, if the identification number of another individual radio selective calling receiver is registered in the individual radio selective calling receiver of the caller, the caller can confirm the contents of a transmission message. If a message error is detected, the call can immediately transmit the message again.

In addition, once an identification number copy command is detected from a received message, the identification number copy command is erased from the command registering means. This operation can prevent a message which is not transmitted as an ID number from being set as an ID number when the message accidentally contains the same contents as an identification number copy command.

Furthermore, since the receiver includes the means for erasing the identification numbers registered in the identification number storage means except for the identification number uniquely assigned to the self-receiver, a combination of a plurality of individual radio selective calling receivers having the same identification number can be arbitrarily changed, realizing versatile simultaneous calling.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENT

An embodiment of the present invention will be described below with reference to the accompanying drawings.

Figure 1:
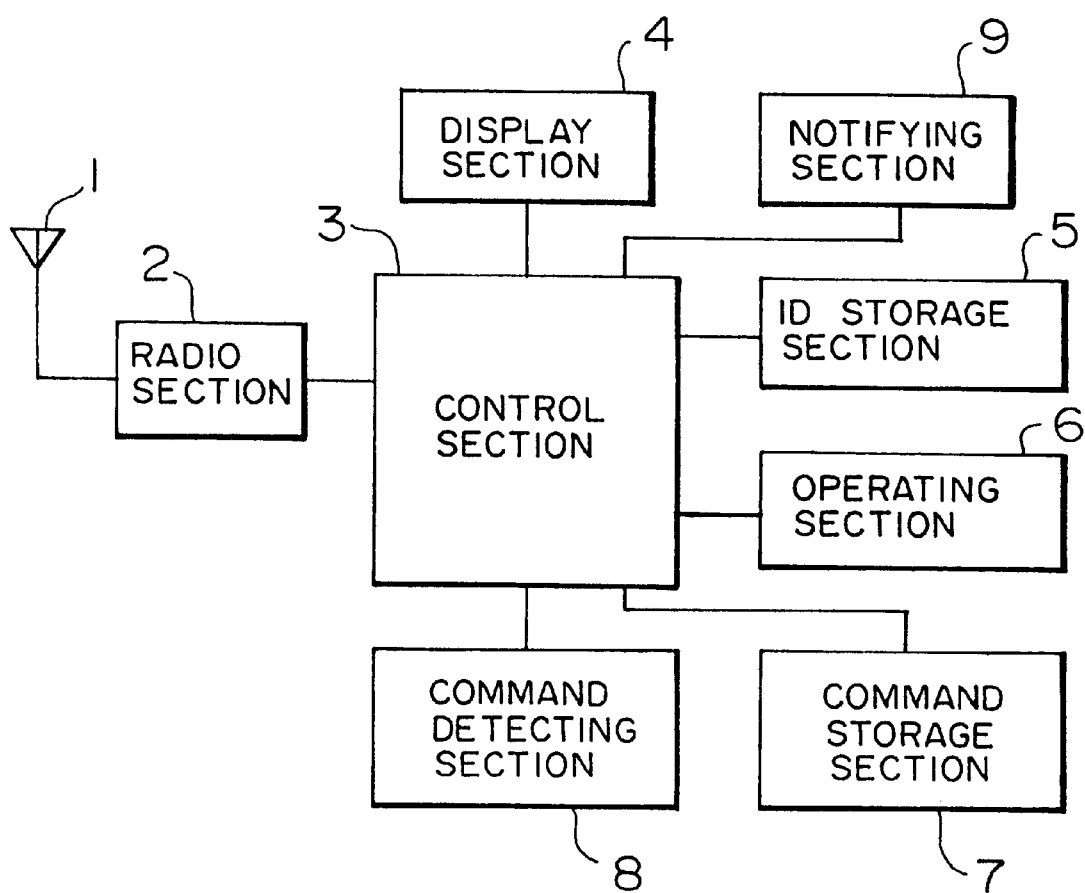
FIG. 1 is a block diagram showing the arrangement of an embodiment of the present invention.

FIG. 1 is a block diagram showing the arrangement of an embodiment of the present invention. Referring to FIG. 1, an individual radio selective calling receiver of this embodiment includes a radio section 2 for receiving a selective call signal converted into a radio signal and transmitted from a radio base station in a radio calling system through an antenna 1, and demodulating the signal into an ID number (identification number and address) and a message, a control section 3 for controlling the overall receiver and processing data input/output to the respective components, a display section 4 for visually displaying the received message to the user, an ID storage section 5 having an electrically programmable nonvolatile memory such as an EEPROM to store a plurality of ID numbers including an ID number uniquely assigned to the self-receiver, an operating section 6 having a push switch (SW) for inputting information and used to input an instruction from the user, e.g., instructions to select/register copy commands (identification number copy commands) specified between a plurality of users, a command storage section 7 for storing a copy command input from the operating section 6, a command detecting section 8 for detecting a copy command from a received message by referring to the command storage section 7, and a notifying section 9 for notifying the user of a call to the self-receiver by using a buzzer or the like.

Figure 2:
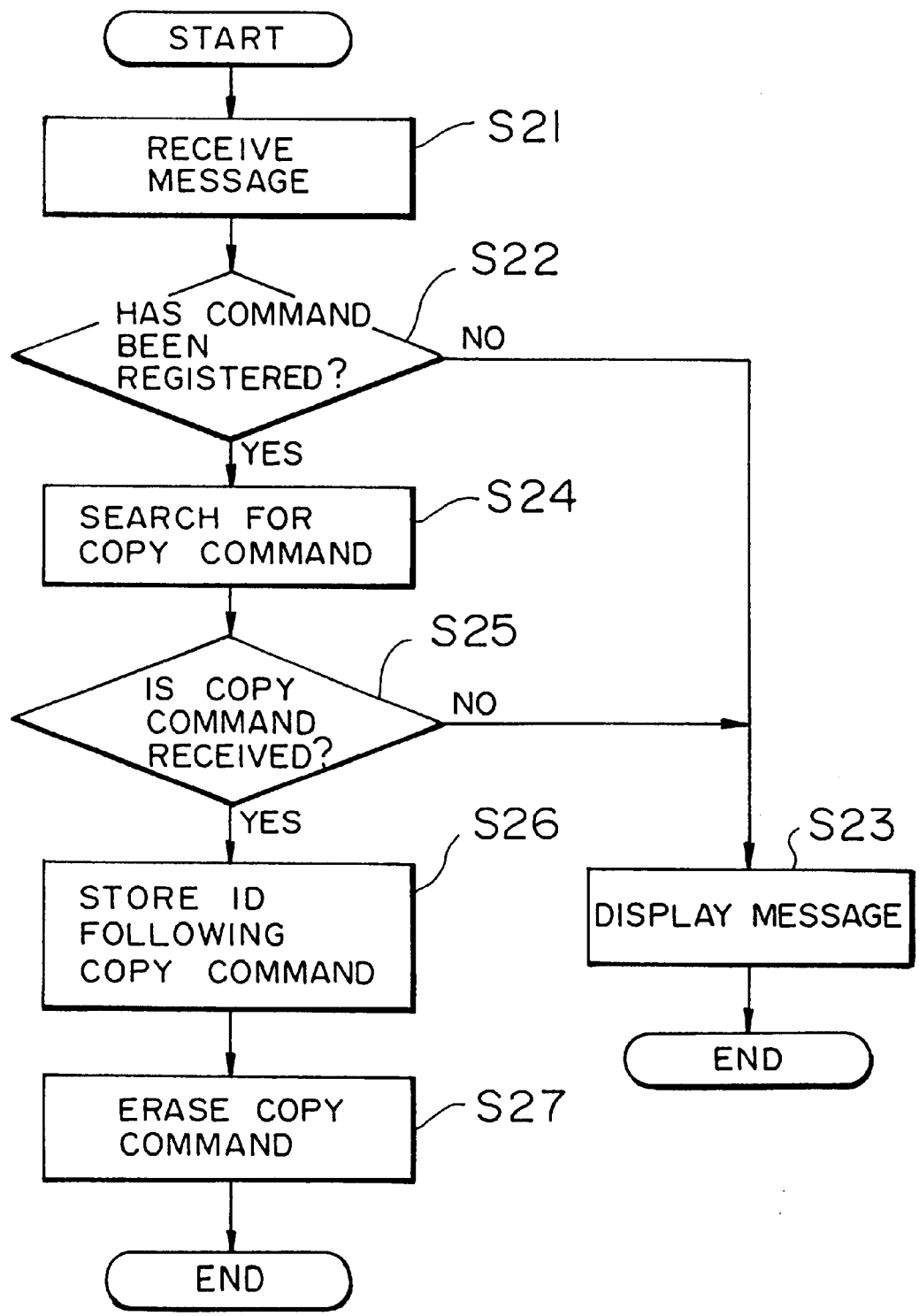
FIG. 2 is a flow chart showing the operation of the embodiment in FIG. 1.

The operation of this embodiment of the present invention will be described next with reference to the flow chart of FIG. 2. The ID number uniquely assigned to this individual radio selective calling receiver is stored in the ID storage section 5 in advance. The radio section 2 receives a radio selective call signal transmitted by radio from a radio base station in the radio calling system, and demodulates the signal into an ID number and a message. The control section 3 checks whether the ID number output from the radio section 2 coincides with any one of the ID numbers registered in the ID storage section 5. If the output ID number coincides with none of the ID numbers, the control section 3 determines that the call is not addressed to the self-receiver, and notifies the radio section 2 that the succeeding message need not be demodulated, thereby saving the power. If the output ID number coincides with any one of the ID numbers, the control section 3 determines that the call is addressed to the self-receiver, receives the succeeding message output from the radio section 2, and drives the notifying section 9 to notify the user of the reception of the call by generating a notifying sound or vibrations (step S21 in FIG. 2). Subsequently, the control section 3 checks whether a copy command is registered in the command storage section 7 (step S22). If no copy command is registered, the control section 3 displays the received message on the display section 4 (step S23), as in a general case. Thus, by not registering a copy command in the command storage section, the user precludes any caller from changing the stored I.D. numbers. If a copy command is registered in the command storage section 7, the control section 3 starts the command detecting section 8 to search the received message for a copy command identical to the one registered in the command storage section 7 (steps S24 and S25). Thus, the caller must know the user input copy command which is currently registered in the receiver. If no copy command is detected, the control section 3 displays the received message on the display section 4 (step S23). If a copy command is detected, the control section 3 determines that the message portion (data) following the copy command is an ID number temporarily assigned to the self-receiver, and additionally registers it in the ID storage section 5 (step S26). Once the copy command is detected, the control section 3 automatically erases the copy command registered in the command storage section 7 to prevent erroneous registration afterward (step S27).

After the new ID number is additionally stored in the ID storage section 5, this individual radio selective calling receiver can receive a message with this ID number. Note that a copy command and an ID number are set in a message when the user of another individual radio selective calling receiver performs message setting in originating a call to the radio selective calling system through a wire telephone to call at the telephone number of this receiver. More specifically, a copy command is specified between the user of another receiver and the user of this receiver, who have agreed to exchange their ID numbers that should be kept secret, and the user of another receiver generates a message together with the ID number unique thereto. Since only the users who have specified the copy command can know the contents of the copy command, there is no possibility that the ID numbers leak to other users. In addition, the ID number (excluding the ID number unique to the self-receiver) which is extracted from the received message and registered in the ID storage section 5 can be erased by the control section 3 in accordance with the switching operation of the operating section 6. With this operation, this individual radio selective calling receiver can control permission/inhibition of simultaneous reception of a message addressed to another receiver.

Figure 3:
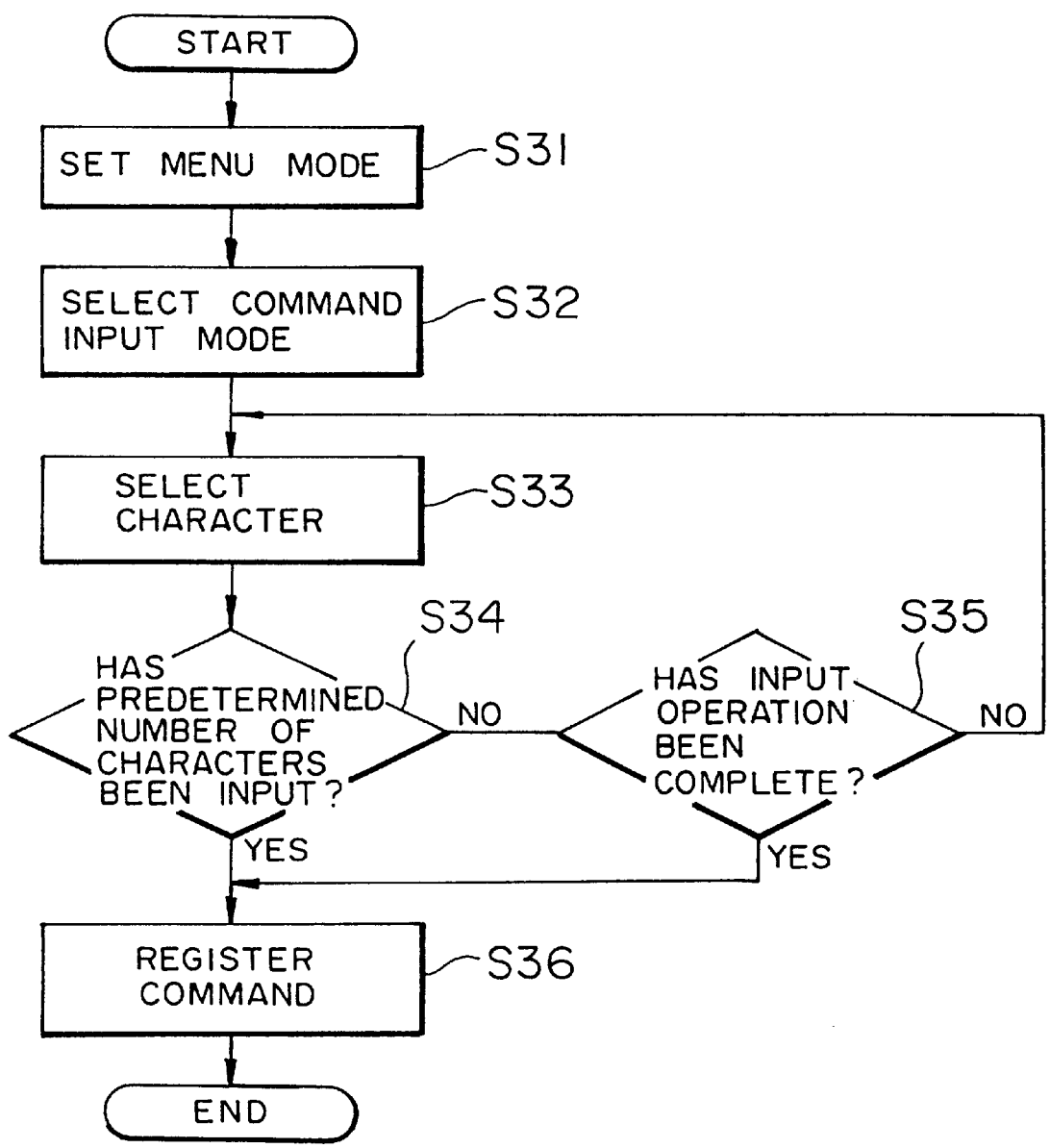
FIG. 3 is a flow chart showing a command registering operation in the embodiment in FIG. 1.

A copy command registering operation will be described in detail next with reference to FIG. 3. In general, no copy command is registered. When the switch (SW) of the operating section 6 is operated to set a menu mode (step S31 in FIG. 3), and a copy command registration mode is selected from the menu displayed on the display section 4, the receiver is set in the mode that allows registration of a command (step S32). Only one character of a command is displayed first on the display section 4. The displayed character is switched to another character every time the push SW is depressed, and an arbitrary character is determined (step S33). This selecting operation is repeated the number of times corresponding to a predetermined number of command characters or less, and selection of the predetermined number of characters is complete (step S34). Alternatively, selection of characters fewer than the predetermined number of characters is complete (step S35). With this operation, the copy command can be registered in the command storage section 7 (step S36).

Figure 4:
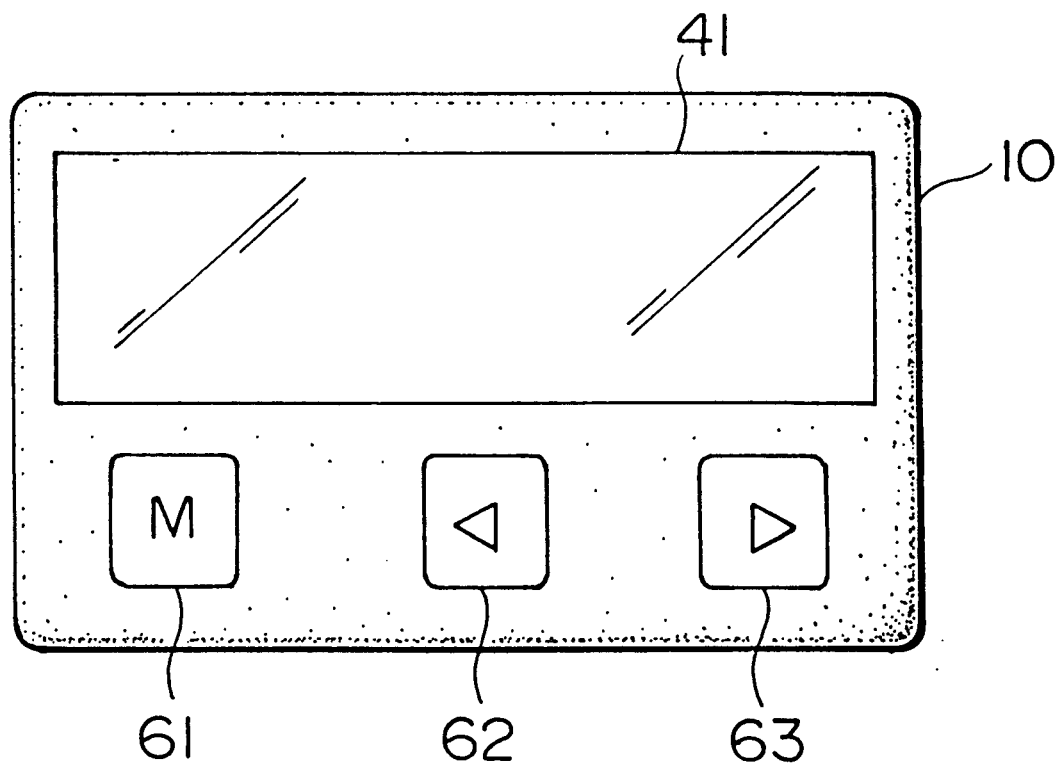
FIG. 4 is a schematic view showing the outer structure of the embodiment of the present invention.
Figure 5A:
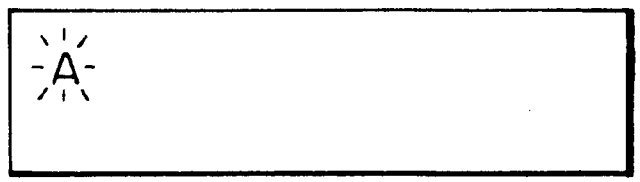
FIGS. 5A to 5E are views sequentially showing screen display samples in a command registering operation.
Figure 5B:
Figure 5C:
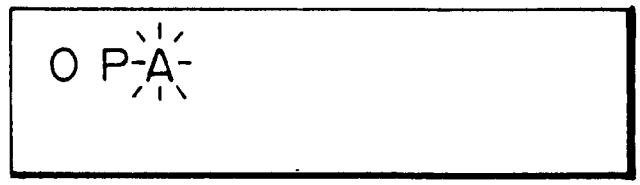
Figure 5D:
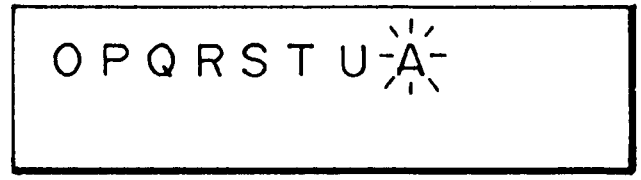
Figure 5E:

An example of command registration will be described with reference to FIG. 4 showing the outer appearance of the individual radio selective calling receiver and FIGS. 5A to 5E showing screen display samples on the display section 4. Referring to FIG. 4, a main body 10 of the individual radio selective calling receiver includes a liquid crystal display (LCD) 41 of the display section 4 for displaying a received message or the like, a menu SW 61 for causing the operating section 6 to perform a menu display operation, a read SW 63 for displaying a received message, and a review SW 62. Command registration can be performed by using these switches. A method of registering a copy command, e.g., "OPQRSTU", will be described below. A copy command registration mode is set as follows. The menu SW 61 is depressed to display the menu. The command registration mode is then selected from the menu by depressing the read SW 63, and is determined by depressing the review SW 62. With this operation, the character "A" is flickered and displayed at the first character position of the copy command on the LCD 41, and a command character selection mode is set (FIG. 5A). The read SW 63 is depressed to select the command characters. As a result, the characters "A" to "Z", "0" to "9", and special characters are sequentially displayed. When the first character "O" of the command is displayed, the review SW 62 is depressed. With this operation, "O" is set in the normal display state, and the character "A" is flickered and displayed at the second character position of the command (FIG. 5B). The second and subsequent characters are determined by the same operation (FIG. 5C), thus determining "OPQRSTU". Thereafter, the character "A" is flickered and displayed at the eighth character position (FIG. 5D). When the menu SW 61 is depressed in this case, the command character selecting operation is complete, and "Completion of Registration" is displayed on the LCD 41. The copy command is then registered (FIG. 5E).

When the above operation is performed with respect to other individual radio selective calling receivers, the corresponding number of receivers can be simultaneously called. Consider, for example, an individual radio selective calling receiver A to which a telephone number A1 and a unique ID number A2 are assigned, an individual radio selective calling receiver B to which a telephone number B1 and a unique ID number B2 are assigned, and an individual radio selective calling receiver C to which a telephone number C1 and a unique ID number C2 are assigned. Assume that the unique ID number B2 of the individual radio selective calling receiver B and the unique ID number C2 of the individual radio selective calling receiver C are temporarily registered as ID numbers in the individual radio selective calling receiver A, the unique ID number A2 of the individual radio selective calling receiver A is temporarily registered as an ID number in the individual radio selective calling receiver B, and the unique ID number A2 of the individual radio selective calling receiver A is temporarily registered as an ID number in the individual radio selective calling receiver C. In this case, the individual radio selective calling receiver A can receive calls addressed to the telephone numbers B1 and C1, in addition to a call addressed to the telephone number A1 of the self-receiver, and display the corresponding messages. That is, when transmitting a message to the individual radio selective calling receiver B or C with the telephone number B1 or C1 through the radio selection calling system, the user of the individual radio selective calling receiver A can receive the message, and hence can check whether the message is properly transmitted. In addition, a message transmitted to the individual radio selective calling receiver A can be simultaneously received by the individual radio selective calling receivers B and C, thus allowing simultaneous calling to all the individual radio selective calling receivers A, B, and C. In contrast to this, only the individual radio selective calling receiver A can receive a message transmitted to the individual radio selective calling receiver B. That is, selective simultaneous calling can be performed with respect to the individual radio selective calling receivers A and B. Similarly, by transmitting a message to the individual radio selective calling receiver C, selective simultaneous calling can be performed with respect to the individual radio selective calling receivers A and C.

What is claimed is:

1. An individual radio selective calling receiver for selectively receiving and displaying a message transmitted by radio and having an identification number assigned thereto to selectively call said receiver, comprising:

identification number storage means for storing a plurality of identification numbers including an identification number uniquely assigned to said self-receiver;

command registering means for inputting and storing an identification number copy command determined and, via the inputting and storing of the identification number copy command, registered by the receiver user in advance;

radio reception means for selectively receiving a message to which an identification number identical to the identification number registered in said identification number registering means is assigned;

command detecting means for monitoring the message received by said radio reception means and detecting the identification number copy command registered in said command registering means; and control means for, when the identification number copy command is detected from the received message by said command detecting means, recognizing a message portion following the command as an identification number temporarily assigned to said self-receiver, and registering the message portion in said identification number storage means.

2. A receiver according to claim 1, wherein said control means erases the identification number copy command registered in said command registering means when said command detecting means detects the identification number copy command from the received message.

3. A receiver according to claim 1, further comprising means for erasing identification numbers registered in said identification number storage means except for the identification number assigned to said self-receiver.

4. A receiver according to claim 1, wherein said command registering means comprises a menu switching means to select a command registering mode, and an identification number copy command input means for registering the user-determined identification number copy command so that the user determines and registers the identification number copy command within said individual radio selective calling receiver.

5. An individual radio selective calling receiver for selectively receiving and displaying a message transmitted by radio and having an identification number assigned thereto to selectively call said receiver, comprising:

identification number storage means for storing a plurality of identification numbers including an identification number uniquely assigned to said self-receiver;

command registering means for inputting and storing an identification number copy command specified in advance;

radio reception means for selectively receiving a message to which an identification number identical to the identification number registered in said identification number registering means is assigned;

command detecting means for monitoring the message received by said radio reception means and detecting the identification number copy command registered in said command registering means; and control means for when the identification number copy command is detected from the received message by said command detecting means, recognizing a message portion following the command as an identification number temporarily assigned to said self-receiver, and registering the message portion in said identification number storage means, wherein said control means erases the identification number copy command registered in said command registering means when said command detecting means detects the identification number copy command from the received message.

6. A receiver according to claim 5, further comprising means for erasing identification numbers registered in said identification number storage means except for the identification number assigned to said self-receiver.

7. A receiver according to claim 6, wherein said command registering means comprises a menu switching means to select a command registering mode and an identification number copy command input means for registering a user determined identification number copy command so that the user determines and registers to identification number copy command within said individual radio selective calling receiver.

8. An individual radio selective calling receiver for selectively receiving and displaying a message transmitted by radio and having an identification number assigned thereto to selectively call said receiver, comprising:

identification number storage means for storing a plurality of identification numbers including an identification number uniquely assigned to said self-receiver;

command registering means for inputting and storing an identification number copy command specified in advance;

radio reception means for selectively receiving a message to which an identification number identical to the identification number registered in said identification number registering means is assigned;

command detecting means for monitoring the message received by said radio reception means and detecting the identification number copy command registered in said command registering means; and control means for when the identification number copy command is detected from the received message by said command detecting means, recognizing a message portion following the command as an identification number temporarily assigned to said self-receiver, and registering the message portion in said identification number storage means, wherein said command registering means comprises a menu switching means to select a command registering mode, and an identification number copy command input means for registering a user determined identification number copy command so that the user determines and registers the identification number copy command within said individual radio selective calling receiver.

* * * * *